E. W. H. HELKEN.
EGG BEATER OR THE LIKE.
APPLICATION FILED JAN. 24, 1912.
1,039,735.
Patented Oct. 1, 1912.
2 SHEETS—SHEET 1.
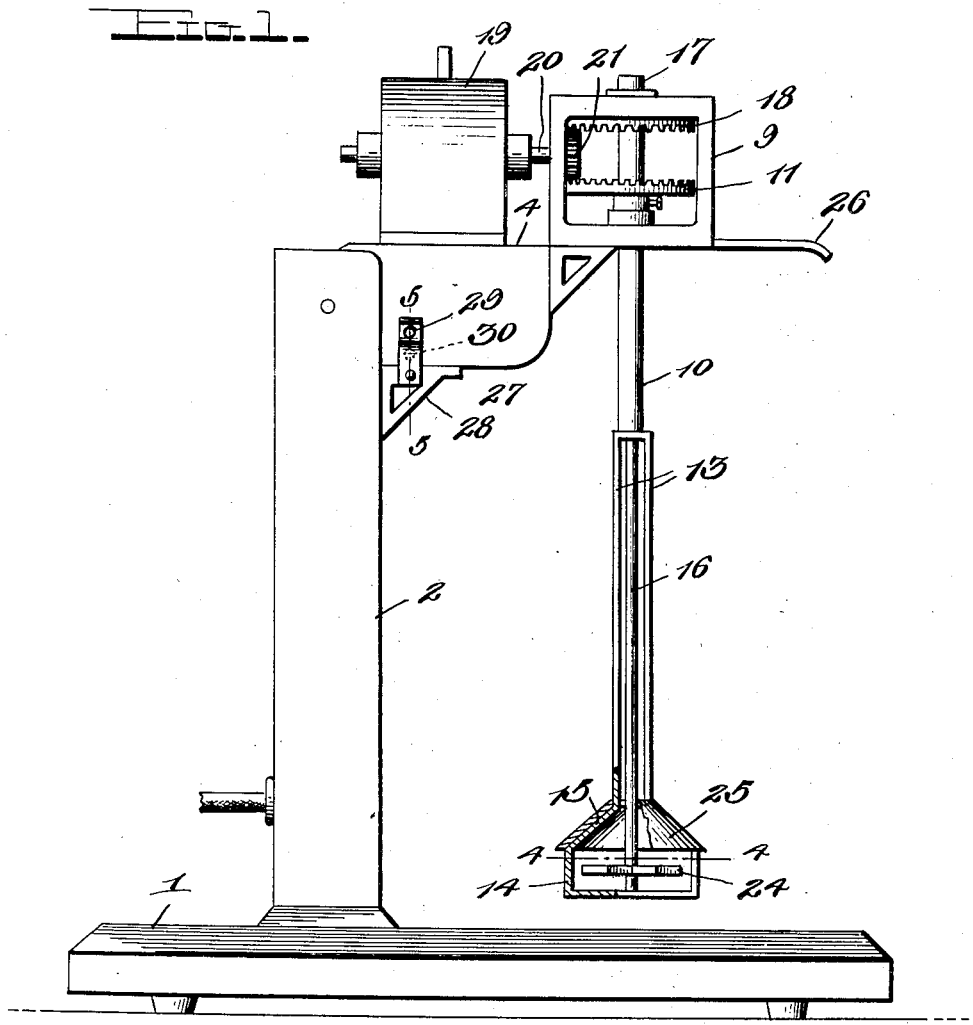
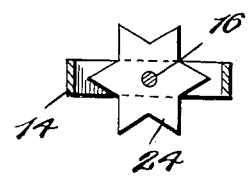
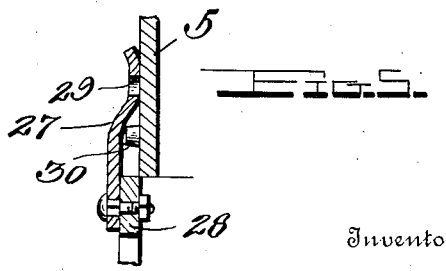
Witnesses
Chas. L. Grieshauer.
G. B. Norton.
Inventor
E.W.H. Helken,
By Watson E. Coleman.
Attorney E. W. H. HELKEN.
EGG BEATER OR THE LIKE.
APPLICATION FILED JAN. 24, 1912.
1,039,735.
Patented Oct. 1, 1912.
2 SHEETS—SHEET 2.
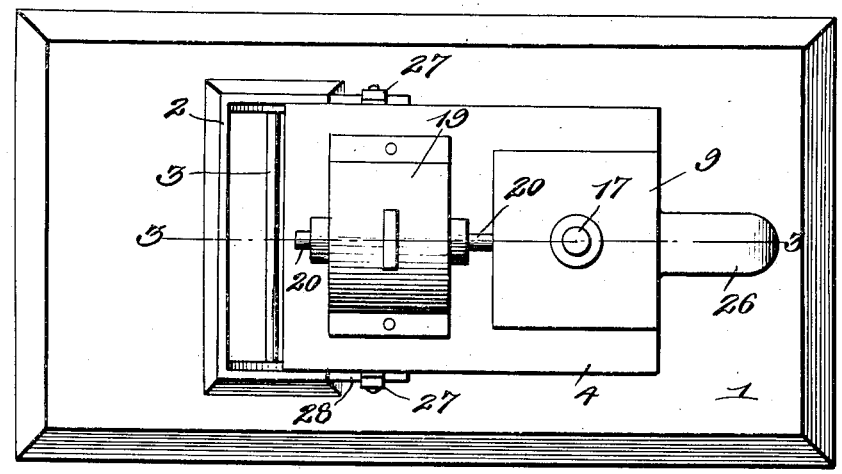
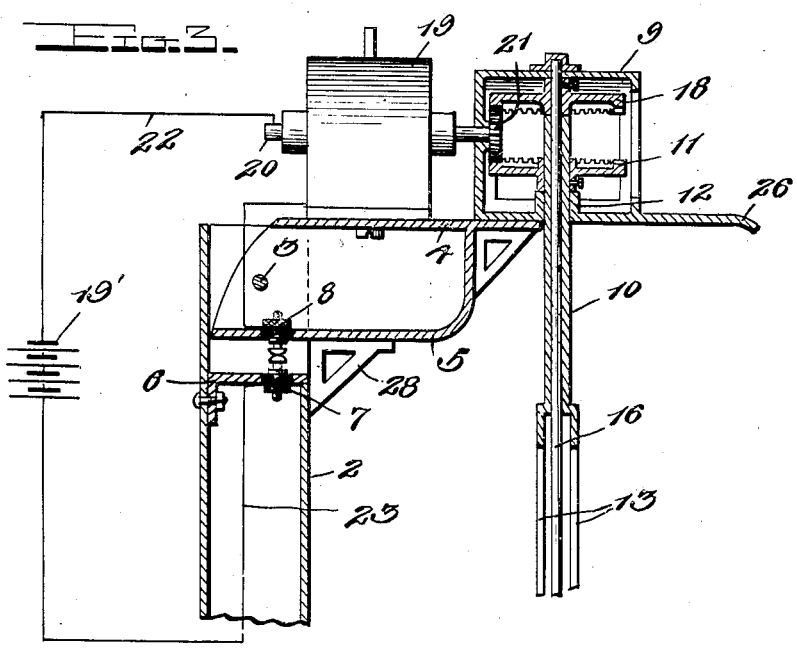
Witnesses
Chas. L. Griesbauer.
A. B. Norton.
Inventor
E. W. H. Helken,
By Watson E. Coleman.
Attorney

UNITED STATES PATENT OFFICE.

EMIL W. H. HELKEN, OF NEW YORK, N. Y.

EGG-BEATER OR THE LIKE.

1,039,735.  Specification of Letters Patent.  Patented Oct. 1, 1912.

Application filed January 24, 1912. Serial No. 673,031.

*To all whom it may concern:*

Be it known that I, EMIL W. H. HELKEN, a citizen of the United States, residing at New York, in the county of New York and State of New York, have invented certain new and useful Improvements in Egg-Beaters or the Like, of which the following is a specification, reference being had to the accompanying drawings.

My invention relates to new and useful improvements in the art of kitchen and table articles and more particularly to an egg beater or the like and my object is to provide a device of this character which will effectively beat eggs, whip cream, mix dough and accomplish other like results.

A further object of the invention resides in providing a device which is motor operated and a still further object resides in providing means for readily breaking the circuit, whereby the device will be inoperatively disposed.

Another object of the invention resides in providing a standard to which is pivotally mounted an arm carrying the beater proper and still another object resides in the provision of a pair of contact posts, one on the standard and one on the pivoted arm, which posts are adapted to contact with one another, when the arm is in its lowermost position, whereby the circuit will be completed to operate the device.

Still another object of the invention is to provide a device which is extremely simple and durable in construction, inexpensive to manufacture and one which will be very efficient and useful in operation.

With these and other objects in view, my invention consists in the novel features of construction, combination and arrangement of parts, as will be hereinafter referred to and more particularly pointed out in the specification and claims.

In the accompanying drawings, forming a part of this application, Figure 1 is a side elevation of the device partly in section showing the device set up for operation; Fig. 2 is a top plan view thereof; Fig. 3 is a fragmentary vertical section through the device, as seen on line 3—3, Fig. 2; Fig. 4 is a horizontal section as seen on line 4—4, Fig. 1, and Fig. 5 is a vertical section as seen on line 5—5, Fig. 1.

In carrying out my invention, I shall refer to the drawings, in which similar reference characters designate corresponding parts throughout the several views, and in which 1 indicates a weighted base of any desired shape and size, I having shown the same rectangular, upon which base is mounted a standard 2, which is hollow and rectangular in cross section. The extreme upper portion of said standard has the inner side wall thereof cut away and extending through the side walls of the standard 2 at this point is a shaft or rod 3, to which is pivotally mounted the dependent side walls of a plate 4, said side walls of the plate being connected below the plate 4, by means of a portion 5. At the point where the cut-away portion of the standard 2 terminates is provided a closure plate 6, which is secured to the walls of said standard and has provided therein, an electrical contact post 7, which, being adjustable, may be permitted to project therefrom any desired amount, while the lower portion or plate 5, which is carried on the plate 4, is also provided with an electrical contact post 8, which is adapted to engage the post 7, when the plate 4 is disposed in a horizontal position, as shown in Fig. 3 and it will be appreciated that were there to be no other function for the posts 7 and 8, the same would form a means by which the plate 4 would be held in its outwardly extended position.

Mounted on the plate 4, adjacent the free end thereof is a frame like housing 9, through the central portion of which extends a vertical tubular shaft 10, which shaft has adjustably mounted thereon, an upwardly facing crown gear 11 and said shaft depends from the housing 9 and is held in position therein by means of a boss 12, formed on the lower wall of the housing, which receives in engagement with the upper peripheral edge thereof, a collar or the like formed on the crown gear 11. The tubular shaft 10 terminates in a pair of elongated spaced apart arms 13 which in turn terminate in a frame like member 14, the upper portion of said frame like member being inclined outwardly from its upper to its lower ends, as shown at 15, the purpose of which will be hereinafter and more particularly described. When the plate 4 is disposed in its horizontal position, this tubular shaft 10, which in turn terminates in the frame 14, is of such length as to dispose said frame 14 immediately adjacent the base 1 and rotatably disposed through the tubular shaft 10 is an additional shaft 16, the upper portion of which is rotatably mounted in a bearing 17 on the upper wall of the housing 9, while the lower end is similarly mounted in the lower wall of the frame 14.

This shaft 16 has also adjustably mounted thereon, a downwardly facing crown gear 18 and a motor 19 mounted on the plate 4, immediately in the rear of the frame like housing 9, has the main shaft 20 thereof disposed through the rear wall of said housing 9, which shaft is provided with a pinion 21, which meshes with the teeth of the two gears 11 and 18. This motor 19 has connection with any source of power 19' and is also connected by means of the wire 22 to the contact post 8, while the contact post 7 is connected to the same source of power by means of a wire 23, whereby it will be seen that the contact post 7 and the post 8 are adapted to be disposed in the same electrical circuit. From this construction it will be seen that when the plate 4 is disposed in its horizontal position, as shown in Figs. 1 and 3, the contact posts 7 and 8 will complete the circuit to cause the motor 19 to be operated and in view of the particular connection of the pinion 21 with the upper and lower crown gears 18 and 19 respectively, the shafts 16 and 10 will be rotated in opposite directions.

The shaft 16 has mounted thereon, adjacent its lower end and within the frame 14, a star-shaped plate 24 which forms a beater or the like and as the shafts 10 and 16 are rotated in opposite directions, it will be seen that all matter within which this portion of the device is disposed will be thoroughly agitated, the frame 14 in itself also forming an agitator or beater. It will be appreciated, however, that the star shaped plate 24 will cause a considerable splashing of the matter as the same is rotated and in order to prevent undue splashing, the inclined or beveled portion 15 of the frame 14 has mounted thereover, a frusto-conical plate 25.

It will be understood that in operating the device a receptacle of any sort (not shown) may be positioned on the base 1, whereupon the plate 4 may be lowered to its horizontal position, which will dispose the agitating portion of the device within the receptacle. As the plate 4 is lowered to its complete horizontal position, the contact posts 7 and 8 will contact with one another, thereby completing the circuit and causing the shafts 16 and 10 to be rotated in opposite directions, as above described. The rotating of these shafts in opposite directions will, of course, cause the matter within the receptacle to be thoroughly agitated and when the operator deems that a sufficient beating has taken place, the plate 4 may be readily raised by means of a handle member or finger piece 26 formed on the lower wall of the housing 9. I have also provided means to retain this plate 4 in its raised position which comprises spring plates 27 which are secured to bearings or the like 28 formed on the one wall of the standard 2, said plates being provided adjacent their upper ends with openings 29 which are adapted to receive therein studs or the like 30, extending laterally from the lower edges of the dependent portions of the plate 4. When in the position, as shown in Fig. 1, the studs 30 will be considerably below the openings 29 in the plates 27 and the lower portion 5 connecting the dependent portions of the plate 4 will rest upon the brackets 28 but when the plate 4 is raised, it will be seen that the studs 30 may be registered with the openings 29 and entered therein to retain said plate in a semi-raised position. This slight raising of the device will be sufficient to break the circuit to allow the operator to remove the receptacle, if the same be quite shallow, or make any repairs that may be found necessary on the device, but should the receptacle that is used be quite deep it may be found necessary to raise the plate 4 to a substantially vertical position before this receptacle can be removed from the base 1. Thus it will be seen that I have provided a device which will effectively beat or agitate matter such as eggs, cream, and dough, with little or no difficulty and which device may be readily disposed to its inoperative position.

From the foregoing it will be seen that I have provided a simple, inexpensive and efficient means for carrying out the objects of the invention and while I have described the elements most well adapted to perform the functions set forth, it is obvious that various changes in form, proportion, and in the minor details of construction may be resorted to without departing from the spirit or sacrificing any of the principles of the invention.

Having thus described my invention what I claim is:

1. In a device of the class described the combination with a standard, and a member pivotally mounted thereon; of a tubular shaft rotatably mounted on said pivotal member and depending therefrom, said tubular member terminating in a frame like agitator, an additional shaft rotatably disposed through said tubular shaft, an agitator carried on the lower portion of said latter shaft and disposed within the aforesaid agitator, a deflector carried on the first mentioned agitator, and means to rotate said shafts in opposite directions.

2. A device of the class described comprising a base, a standard thereon, a member pivotally mounted on the upper portion of said standard, means to support said pivoted member in its horizontal position, a housing mounted on said pivotal member, beater shafts depending from said housing, means to cause said shafts to be rotated in opposite directions upon the disposition of the pivotal member to its horizontal position, a finger piece formed on said housing to raise and lower said pivotal member and adjunctive parts, and means to retain said pivotal member and parts carried thereby in their raised and ineffective positions.

3. A device of the class described comprising a base, a standard mounted thereon, a member pivotally carried on the upper portion of the standard, bracket members also carried on the standard to support said pivoted member in a horizontal position, beater shafts carried on the pivotal member, means to cause said shafts to be rotated upon the disposition of the pivotal member to a horizontal position, leaf spring members secured to said bracket members and adapted to contact with the sides of said pivotal member, said spring members being provided with openings therein, and studs mounted on the sides of said pivotal member adapted to engage the openings in said spring members to retain said pivotal member raised above a horizontal position.

In testimony whereof I hereunto affix my signature in the presence of two witnesses.

EMIL W. H. HELKEN.

Witnesses:
 . HERMANN D. HELKEN,
   BENJAMIN LEVENTHAL.